US008443504B2

(12) United States Patent
Clendenning et al.

(10) Patent No.: US 8,443,504 B2

(45) Date of Patent: May 21, 2013

(54) PIN TOOL ASSEMBLY FOR ACTING ON A RETAINING PIN FOR A TOOTH OF A GROUND ENGAGING IMPLEMENT

(75) Inventors: Charles Clendenning, Broken Arrow, OK (US); Brian L. Launder, Tulsa, OK (US); Russell N. Drake, Claremore, OK (US)

(73) Assignee: H&L Tooth Company, Tulsa, OK (US)

( * ) Notice: Subject to any disclaimer, the term of this patent is extended or adjusted under 35 U.S.C. 154(b) by 610 days.

(21) Appl. No.: 12/658,539

(22) Filed: Feb. 5, 2010

(65) Prior Publication Data

US 2011/0191999 A1 Aug. 11, 2011

(51) Int. Cl.
*B23P 19/02* (2006.01)
*B23P 19/04* (2006.01)
*B25B 27/02* (2006.01)

(52) U.S. Cl.
USPC ................ 29/426.5; 29/278; 29/283; 29/255; 29/275; 29/280; 29/525; 81/463; 81/489

(58) Field of Classification Search
USPC .................. 29/253, 254, 255, 275, 276, 280, 29/283, 426.5, 525, 426.6, 278, 270, 244; 37/406, 446, 452, 453, 467, 456, 457, 458; 81/463, 44, 489, 490, 52.2, 439, 184; 172/701.1, 172/701.2, 701.3
See application file for complete search history.

(56) References Cited

U.S. PATENT DOCUMENTS

| | | | | |
|---|---|---|---|---|
| 1,355,631 A | | 1/1920 | Wellbrook | |
| 3,268,991 A | | 8/1966 | Beinhaur | |
| 3,750,500 A | * | 8/1973 | Peterson | 81/463 |
| 3,999,275 A | | 12/1976 | Schmidt | |
| 4,178,701 A | | 12/1979 | Sadler | |
| 4,641,412 A | * | 2/1987 | Olger | 29/426.5 |
| D290,399 S | * | 6/1987 | Kitchens | D24/142 |
| 5,009,017 A | * | 4/1991 | Diekevers et al. | 37/456 |
| 5,016,365 A | * | 5/1991 | Robinson | 37/451 |
| 5,058,257 A | | 10/1991 | Freestone et al. | |
| 5,172,500 A | * | 12/1992 | Renski et al. | 37/457 |
| 5,224,282 A | * | 7/1993 | Swick | 37/453 |
| 5,778,570 A | * | 7/1998 | Eichelberger | 37/450 |
| 5,966,848 A | * | 10/1999 | Monteiro et al. | 37/452 |
| 6,006,631 A | * | 12/1999 | Miner et al. | 81/177.85 |
| 6,032,390 A | * | 3/2000 | Bierwith | 37/456 |
| 6,047,487 A | * | 4/2000 | Clendenning | 37/452 |
| 6,247,255 B1 | * | 6/2001 | Clendenning | 37/452 |
| 6,351,881 B1 | | 3/2002 | Peckich et al. | |
| 6,883,221 B1 | | 4/2005 | Hayes, III | |
| D513,576 S | | 1/2006 | Launder | |
| D522,819 S | | 6/2006 | Launder | |

* cited by examiner

*Primary Examiner* — Joshua J Michener
*Assistant Examiner* — Chi Q Nguyen
(74) *Attorney, Agent, or Firm* — Law Offices of John W. Harbst

(57) ABSTRACT

A pin tool assembly for forcibly removing a first type of retaining pin from digging teeth arranged in side-by-side relation across a forward edge of a digging implement. The pin tool assembly includes a tool defining a blind recess laterally disposed to one side of the tool. The tool assembly further includes an elongated extractor pin having an enlarged head portion and a shank portion extending from the head portion. Cooperating instrumentalities maintain and position the extractor pin relative the tool such that, when a force is applied to the tool, the free end of the shank portion of the pin engages with and forcibly extracts the retaining pin from the digging tooth. Preferably, the tool further defines a plurality of openings for snugly accommodating a series of retaining pins therein.

23 Claims, 9 Drawing Sheets

FIG. 9
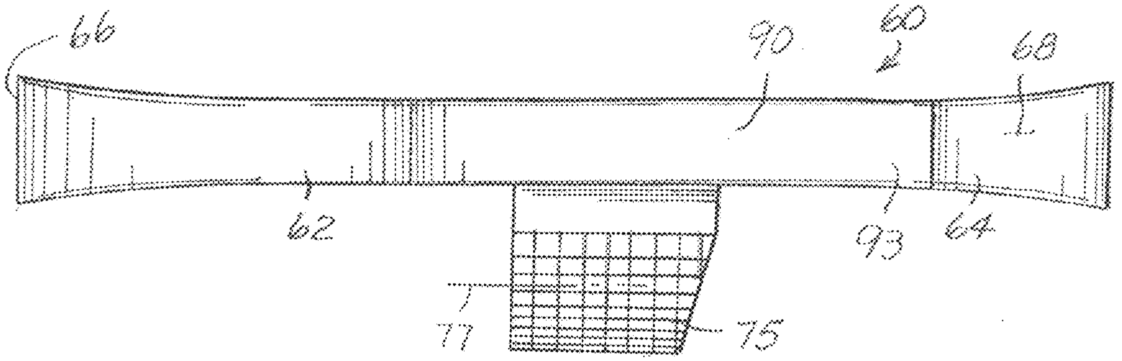
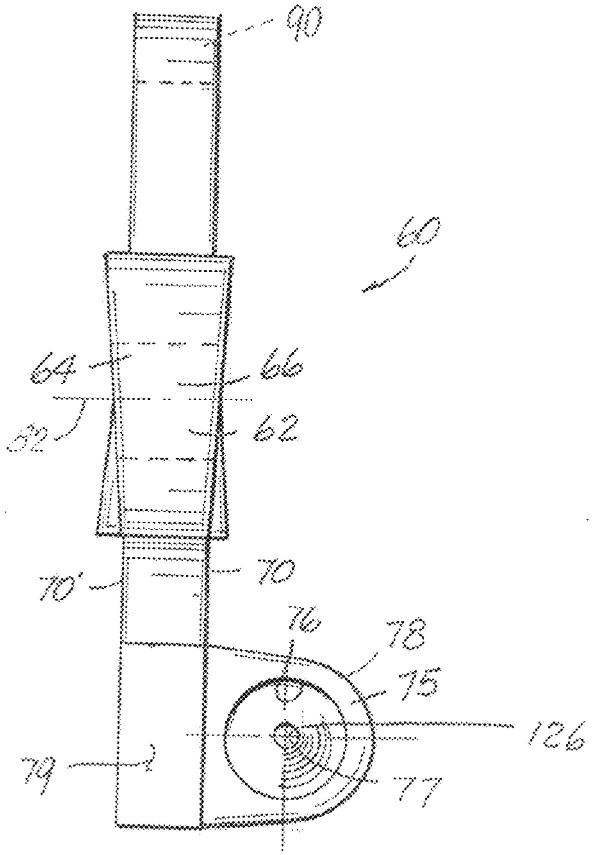
FIG. 10

PIN TOOL ASSEMBLY FOR ACTING ON A RETAINING PIN FOR A TOOTH OF A GROUND ENGAGING IMPLEMENT

FIELD OF THE INVENTION DISCLOSURE

The present invention disclosure generally relates to ground engaging implements and, more particularly, to a pin tool assembly for acting on a retaining pin used to operably interconnect a digging tooth to an adapter extending forward from a digging implement such as a bucket or the like.

BACKGROUND OF THE INVENTION DISCLOSURE

Ground engaging implements such as back-hoes, front-end loaders, excavators and related types of equipment typically include a bucket. The bucket of such devices includes a leading forward edge or lip having a series of digging tooth assemblies arranged in laterally adjacent or side-by-side relation relative to each other across the forward edge of lip.

To enhance their durability, ground penetration capability and overall usefulness, such digging tooth assemblies now usually include two pieces. That is, each digging tooth assembly includes a shank or support connected to and extending forward from the forward or leading edge of the bucket and a digging tooth. Such two piece construction permits the digging tooth to be replaced when required thereby maintaining a relatively sharp edge for the digging tooth assembly thereby enhancing bucket penetration capabilities. Typically, about 5 to fifteen teeth (depending upon digging conditions wherein the digging tooth assembly is utilized and the equipment being used) can be replaced on the support or adapter before requiring the adapter or support to be replaced.

In the past decades, the preferred method for connecting the digging tooth and adapter in operable combination relative to each other involves a side pinning design. Different forms of retaining pins are used to operably interconnect the digging tooth and support or adapter. In each instance, however, the retaining pin passes at least partially endwise through axially aligned bores in the sides of the digging tooth and through an aligned bore in the adapter or support whereby releasably coupling the tooth and adapter in operable combination.

One type of retaining pin used to operably couple the tooth and adapter involves a longitudinally elongated solid steel cylindrical pin. This type of retaining pin is maintained in place by compression and friction. A second type of retaining pin used to operably couple the tooth and adapter is frequently referred to as a "flex-pin". The "flex-pin" retainer includes two longitudinally elongated pins halves which are joined by an elastomeric center portion. It is common for the ends of the pin halves to be tapered whereby facilitating their setting within the digging tooth assembly. Moreover, each pin halve furthermore typically includes a radial shoulder disposed adjacent to the end of pin halve so as to coact with the tooth and adapter whereby positively holding the retainer pin in place during digging tooth assembly operation.

The side-by-side arrangement of the digging teeth relative to each other presented logistical problems relating to installation and removal of the retaining pin for each tooth assembly. That is, it was difficult and extremely awkward to align a hammer to the retaining pin due to interference from adjacent adapters and teeth.

The prior art has attempted to address the logistical problems mentioned above with very specialized tools which are specifically designed to hold an offset retaining pin or punch to facilitate retaining pin installation and removal. Although such special tools functioned reasonably well, they proved expensive and were manufactured to operate in conjunction with only one specific type or style of retaining pin. This created economic waste, with operators having to procure multiple tools for various retaining pin applications. In view of the frequency such digging teeth are replaced, the operator had to be sure they had the appropriate tool for the particular type of retaining pin used to operably couple the tooth and adapter to each other.

While the prior art, to some limited degree, addressed the issue of retaining pin installation and removal, it did not address and thus offered no solution to a related problem. That related problem involves storage of replacement retaining pins. Operators attempting to change the digging teeth on a bucket are tasked with both locating the appropriate retaining pin removal tool and also locating a usable set of replacement retaining pins. Frequently, new retaining pins gravitate to a bottom of an operator's tool box thus resulting in the loss of additional but valuable time to locate the replacement retaining pins.

Thus, there is a need and continuing desire for a tool assembly capable of acting on more than one type of retaining pin used to operably interconnect a digging tooth and adapter and which, in a preferred form, has retaining pin storage capabilities along with additional enhancements.

SUMMARY OF THE INVENTION DISCLOSURE

In view of the above- and in accordance with one aspect, there is provided a pin tool assembly for forcibly removing a first type of retaining pin from digging teeth arranged in side-by-side relation across a forward edge of a digging implement. The pin tool assembly includes a tool defining a blind recess disposed to one side of the tool. The tool assembly further includes an elongated pin extractor having an enlarged head portion and a shank portion extending from the head portion. Cooperating instrumentalities maintain and position the extractor pin relative the tool such that, when a force is applied to a striking face of the tool, the shank portion of the pin engages with and forcibly extracts the retaining pin from the digging tooth.

In one form, the tool further defines a vertical surface disposed laterally adjacent to the recess defined by the tool. Preferably, the tool further defines a plurality of openings for snugly accommodating a plurality of a second type of retaining pins therein. Each opening in the tool has an axis extending generally normal to a longitudinal axis of the tool. The predetermined diameter of the blind recess in the tool is preferably sized to releasably hold one of the second type of retaining pin at least partially therein for the initial setting of the second type of retaining pin in a bore of a digging tooth. Preferably, a marginal edge of at least one of the plurality of openings defined by the tool is configured to accommodate and removably hold the shank portion of the elongated pin extractor between the second type of retaining pin and the tool.

The cooperating instrumentalities for the pin tool assembly include a compressible elastomer arranged about the enlarged head portion of the extractor pin for engagement with the predetermined diameter of the blind recess in the tool. Moreover, the cooperating instrumentalities for the pin tool assembly furthermore preferably includes an axial projection on at least one of the enlarged head portion of the extractor pin and an interior of the blind recess in the tool for locating and positioning the head portion of the extractor pin lengthwise within the blind recess in the tool.

According to another aspect, there is provided a pin tool assembly for forcibly inserting and extracting a retaining pin from a digging tooth secured to an adapter on a digging implement. The pin tool assembly includes an elongated pin extractor having axially aligned first and second ends and further includes an enlarged head portion and a shank portion extending from the head portion. The pin tool assembly also includes a tool having a main body with a first end, a striking face defining second end of the tool, a bottom surface, and a pair of generally planar sides extending between the ends. The tool further includes a pin holder secured to the main body intermediate the ends. The pin holder includes a holder block disposed beneath the bottom surface and extends laterally from one side of the main body. The holder block defines a blind recess opening to the first end of the main body. Preferably, the blind recess defined by the holder block has a closed marginal edge of predetermined diameter. Cooperating instrumentalities on the enlarged head portion of the extractor pin and the blind recess in the holder block maintain and position the pin extractor relative to the main body such that, when a force is applied to the striking face of the main body, the free end of the shank portion of the extractor pin engages with and forcibly extracts a first type of retaining pin from the digging tooth. The predetermined diameter of the blind recess is configured to hold a second type of retaining pin different from said first type of retaining pin for initial setting within a bore in the digging tooth.

Preferably, the bottom surface of the tool is adapted to be disposed on the digging tooth while the second type of retaining pin is being set. In one form, the bottom surface of the tool is adapted to be disposed on the digging tooth while the shank portion of the extractor pin engages with and forcibly extracts a first type of retaining pin from the digging tooth. In a preferred form, the main body of the tool further defines a vertical surface forming part of the pin holder. In another embodiment, the main body of the tool further defines a plurality of openings for accommodating a plurality of the second type of retaining pin therein. Each opening on the main body of the tool has an axis extending generally normal to longitudinal axis of the main body. Preferably, a marginal edge of at least one of the plurality of openings defined by the tool is configured to accommodate and removably hold the shank portion of the elongated pin extractor between the second type of retaining pin and the tool. To enhance handling characteristics, an outer surface of the pin holder of the tool is provided with a textured surface configuration In a preferred form, the cooperating instrumentalities on the tool and extractor pin include a compressible elastomer arranged about the enlarged head portion of the extractor pin for engagement with the predetermined diameter of the blind recess in the pin holder. In one form, the cooperating instrumentalities further includes an axial projection on at least the enlarged head portion of the extractor pin or an interior of the blind recess for locating and positioning the head portion of the extractor pin lengthwise within the blind recess in the pin holder.

According to another aspect, there is provided a pin tool assembly for forcibly inserting and extracting a retaining pin from a digging tooth secured to an adapter on a digging implement. The pin tool assembly includes an elongated pin extractor having axially aligned first and second ends and an enlarged head portion with a shank portion extending from the head portion. The pin tool assembly also includes a tool having a main body with first end, a striking face defining second end of the tool, a bottom surface, and a pair of generally planar sides extending between the ends. The tool further includes a pin holder secured to the main body intermediate the ends. The pin holder includes a holder block disposed beneath the bottom surface and extending laterally from one side of the main body. The holder block defines a blind recess having a predetermined diameter and opening to the first end of the main body. Cooperating instrumentalities on the enlarged head portion of the extractor pin and the blind recess in the holder block maintain and position the pin extractor relative to the metal body such that, when a force is applied to the striking face of the main body, the free end of the shank portion of the pin engages with and forcibly extracts a first type of retaining pin from the digging tooth. The predetermined diameter of the blind recess is configured to hold a second type of retaining pin different from the first type of retaining pin for initial setting within a bore in the digging tooth. A free-ended longitudinally elongated extractor pin is secured to the main body in vertically spaced, generally parallel relation relative to an upper surface of the main body.

In one form, the bottom surface of the tool is adapted to be disposed on the digging tooth while the second type of retaining pin is being set. In another form, the upper surface of the tool is adapted to be disposed on the digging tooth while the free-ended longitudinally elongated extractor pin is used to extract a pin from the digging tooth.

Preferably, the main body of the tool further defines a vertical surface forming part of the pin holder. In another form, the tool defines a plurality of openings for snugly accommodating a plurality of the second type of retaining pin therein. Each opening has an axis extending generally normal to longitudinal axis of the tool. In one form, a marginal edge of at least one of the plurality of openings defined by the tool is configured to accommodate and removably hold the shank portion of the elongated pin extractor between the second type of retaining pin and the tool. In a preferred embodiment, an outer surface of the pin holder of the tool is textured.

In a preferred form, the cooperating instrumentalities of the pin tool assembly include a compressible elastomer arranged about the enlarged head portion of the extractor pin for engagement with the predetermined diameter of the blind recess in the pin holder. In one form, the cooperating instrumentalities further includes an axial projection on either the enlarged head portion of the extractor pin or an interior of the blind recess for locating and positioning the head portion of the extractor pin lengthwise within the blind recess in the pin holder.

DESCRIPTION OF THE DRAWINGS

FIG. 9 is a top plan view of the tool shown in FIG. 8;

FIG. 10 is an end view of the tool shown in FIG. 8;

DETAILED DESCRIPTION OF THE INVENTION DISCLOSURE

Figure 1:
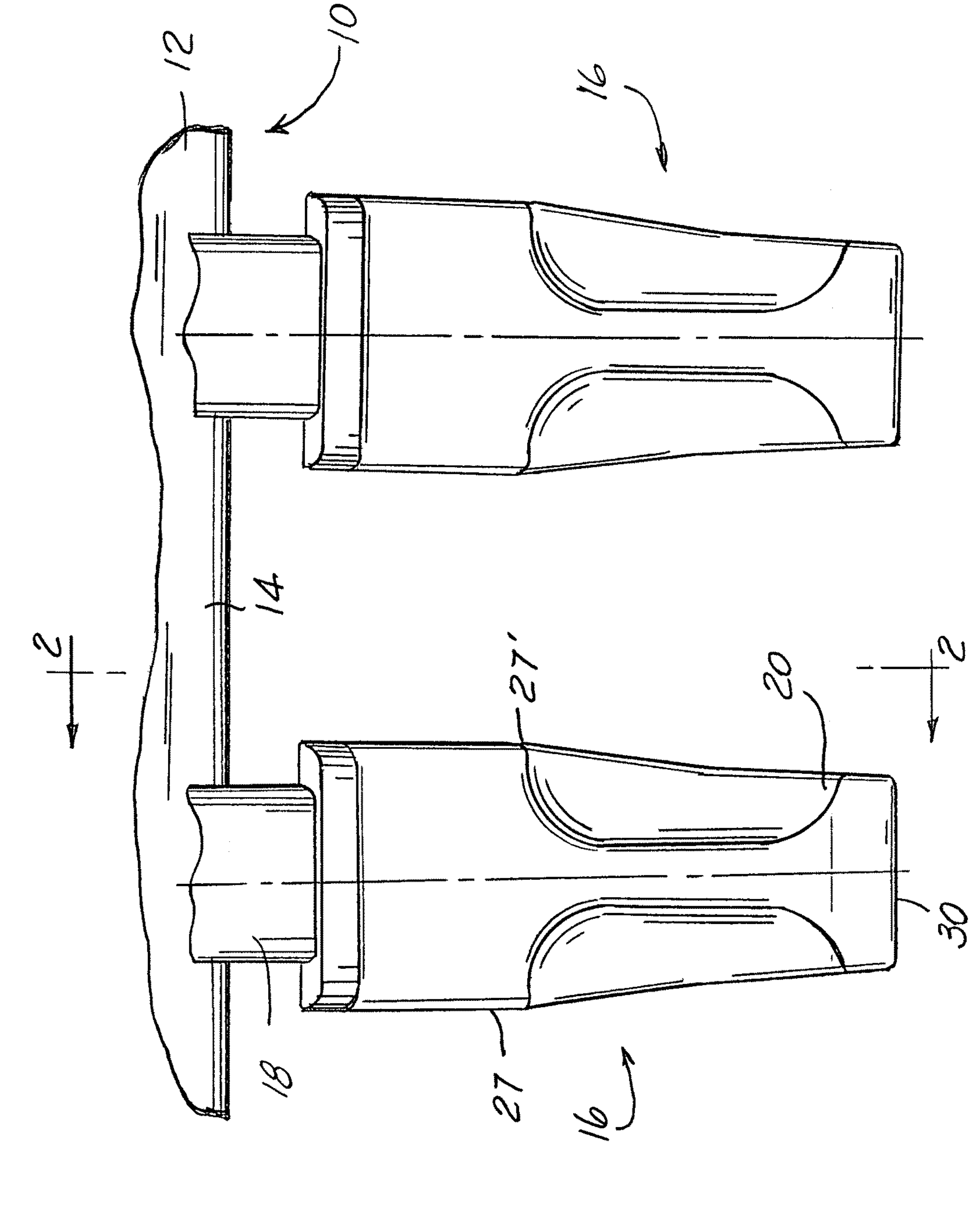
FIG. 1 is a fragmentary top plan view of a digging implement having a series of digging tooth assemblies arranged across a forward end of a bucket lip.

While this invention disclosure is susceptible of embodiment in multiple forms, there is shown in the drawings and will hereinafter be described a preferred embodiment, with the understanding the present disclosure sets forth an exemplification of the disclosure which is not intended to limit the disclosure to the specific embodiment illustrated and described.

Referring now to the drawings, wherein like reference numerals indicate like parts throughout the several views, there is shown in FIG. 1 a digging implement 10 of the type with which the present invention disclosure finds utility. In the illustrated embodiment, the digging implement 10 is shown to include a bucket 12 having a leading or front edge 14. Extending forward or outward from the leading edge 14 and connected in side-by-side relation relative thereto are a series of digging tooth assemblies 16. In the embodiment illustrated by way of example in the drawings, each digging tooth assembly is substantially identical relative to a laterally adjacent digging tooth assembly. As such, only one digging tooth assembly 16 will be described in detail.

Suffice it to say, each digging tooth assembly 16 includes a support or adapter 18 which is operably coupled or secured to the leading edge 14 of the bucket 12. In many instances, a rear or base portion of the adapter or support 18 is welded to the bucket 14. A tooth or cap 20 is longitudinally arranged about and along a leading or nose portion of each adapter or support 18.

Figure 2:
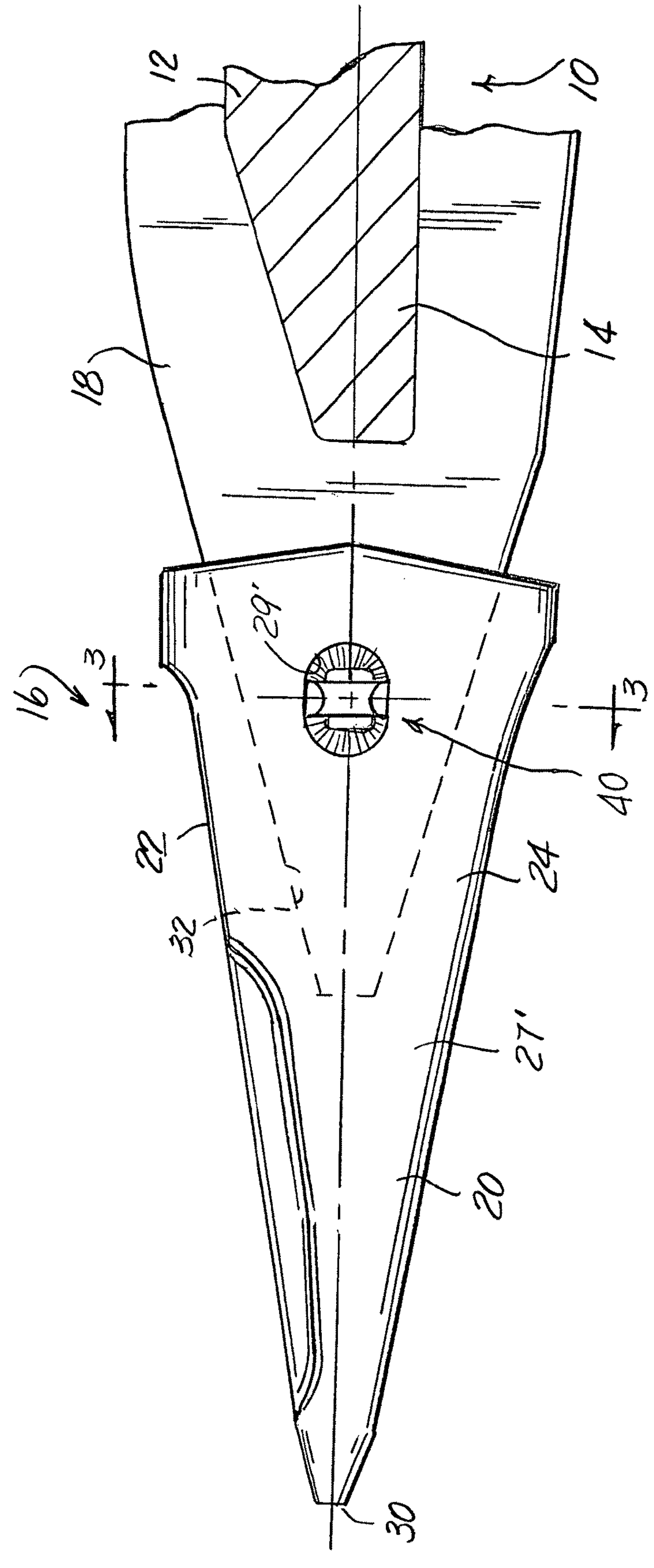
FIG. 2 is an enlarged view taken along line 2-2 of FIG. 1.

As shown in FIG. 2, the tooth or cap 20 includes an upper or top surface 22, a lower or bottom surface 24, and a pair of generally parallel sides 27 and 27' (FIG. 1) extending between the top and bottom surfaces 22 and 24, respectively. As known in the art, the top and bottom surfaces 22 and 24 angularly diverge away from each other as they extend rearwardly from a leading edge 30 of the tooth 20. A blind cavity 32 opens to a rear end of the digging tooth/wear part 20 and is configured to endwise accommodate a lengthwise and leading portion of an axially aligned adapter 16. A retainer pin 40 operably couples the adapter 18 and tooth 20 in releasable combination relative to each other. Such a two-piece design permits the tooth to be replaced as the tooth wears or is broken as a result of use.

Figure 3:
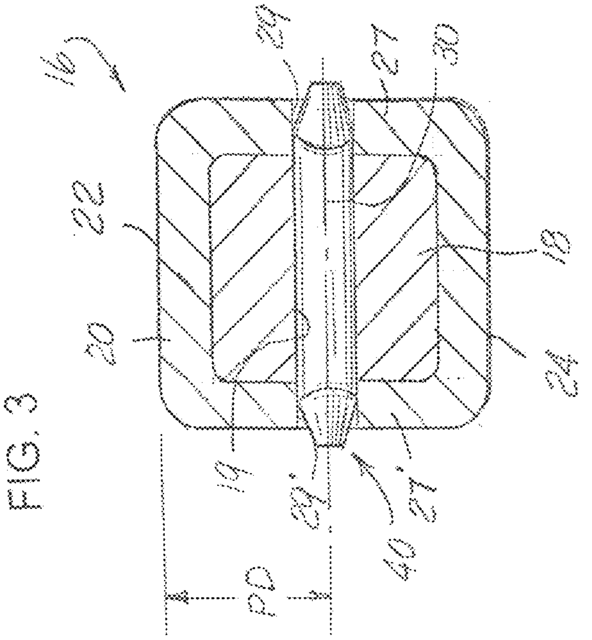
FIG. 3 is a sectional view taken along line 3-3 of FIG. 2.

As shown in FIG. 3, the digging tooth 20 typically includes a pair of bores or openings 29 and 29' defined by the tooth sides 27 and 27', respectively, and which are aligned relative to each other along an axis 30. When the tooth 20 is properly fitted along and about a lengthwise portion of the adapter 16, a throughbore or opening 19 in the nose portion of the adapter 18 is arranged in registry with the bores 29, 29' in the digging tooth 20 whereby allowing the retaining pin 40 to be passed endwise therethrough.

Figure 5:
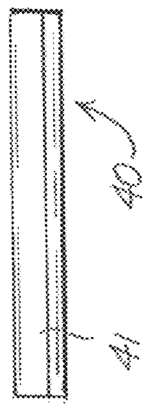
FIG. 5 is a top plan view of the retaining pin illustrated in FIG. 4.
Figure 4:
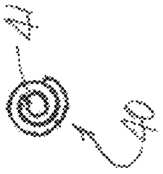
FIG. 4 is an end view of one type of retaining pin used to operably interconnect a digging tooth and adapter.

Depending on the tooth design, different types of retaining pins can be used to operably couple the adapter 18 and 20 to each other. One type of conventional retaining pin is illustrated in FIGS. 4 and 5. The retaining pin illustrated in FIGS. 4 and 5 has an axially elongated design and includes a spiral-like pin with a generally cylindrical outer diameter. This type of pin retainer is maintained in place by compression and friction.

Figure 6:
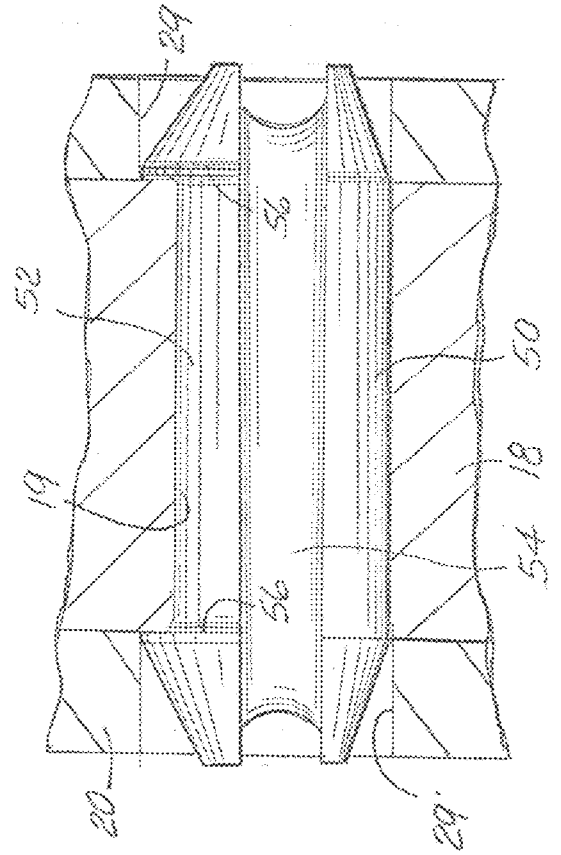
FIG. 6 is a top plan view of a second type of retaining pin used to operably interconnect a digging tooth and adapter.
Figure 7:
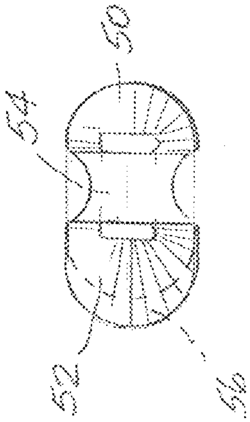
FIG. 7 is an end view of the retaining pin illustrated in FIG. 6.

A second type of conventional retaining pin is illustrated in FIGS. 6 and 7. The retaining pin illustrated in FIGS. 6 and 7 is commonly referred to as a “flex-pin” retainer and includes two longitudinally elongated pins halves 50 and 52 which are joined by an elastomeric center portion 54. Typically, the cross-sectional configuration of the retaining pin illustrated in FIGS. 6 and 7 is greater than the cross-sectional configuration of the retaining pin illustrated in FIGS. 4 and 5. The elastomeric center portion 54 allows the pin halves 50, 52 to be radially compressed as they pass through the bore 29, 29' (FIG. 6) in the tooth 20 and then spring outwardly after the retaining pin is fully inserted into operable combination with the digging tooth and adapter. As illustrated in FIG. 6, the pin halves 50 and 52 have tapered ends whereby facilitating their setting within the digging tooth assembly. Moreover, the pin halve 52 furthermore typically includes a pair of radial shoulders 56 disposed adjacent to the end of the pin halve so as to coact with and lock to the adapter 18 and tooth 20 whereby positively maintaining the retainer pin in place during digging tooth assembly operation.

Figure 8:
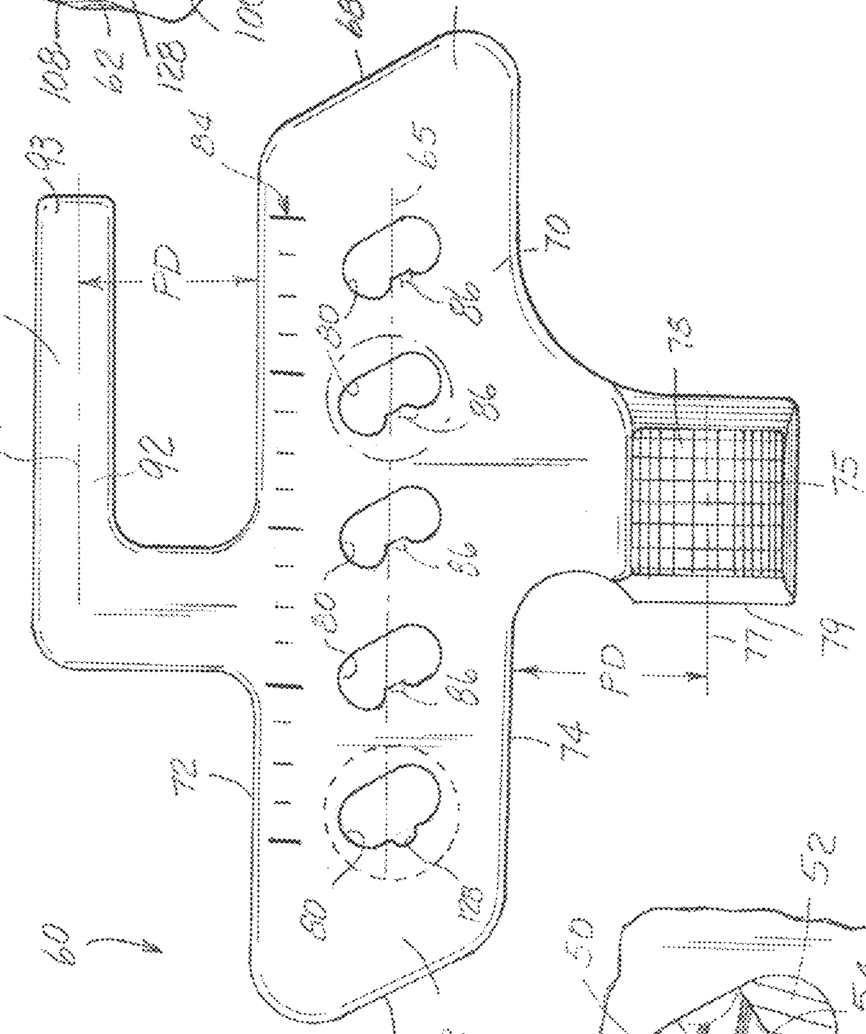
FIG. 8 is a front elevational view of a tool forming part of the pin tool assembly of the present invention disclosure.
Figure 12:
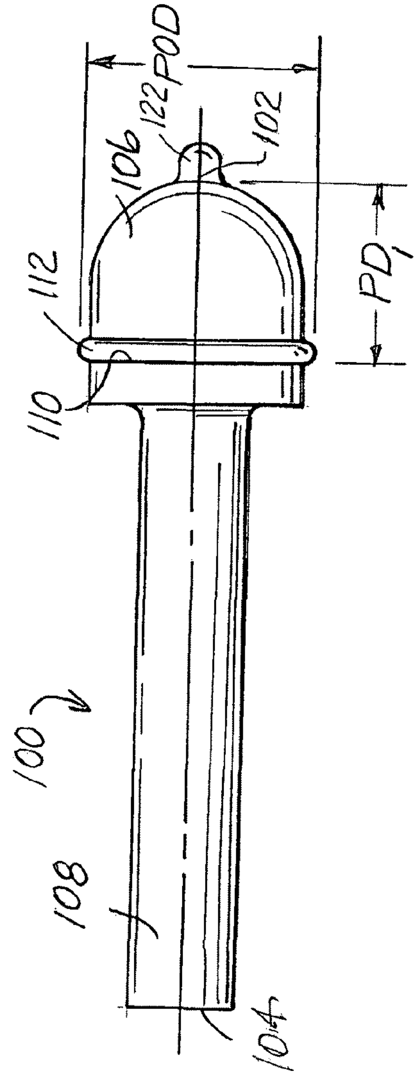
FIG. 12 is an enlarged front view of an extractor pin forming another part of the pin tool assembly of the present invention disclosure.

According to this invention disclosure, a pin tool assembly 60 is provided for operably acting on the retaining pin 40 (FIG. 3) used to interconnect the adapter 18 and digging tooth 20. In the exemplary embodiment illustrated in FIG. 8, the pin tool assembly 60 includes a tool 62 and an extractor pin 100 (FIG. 12). As shown in FIG. 8, tool 62 includes a longitudinally elongated main body 64 which is preferably formed from steel or other suitable metal. The main body 64 of tool 62 has a first end 66, a striking face defining a second end 68 and a pair of generally planar sides 70 and 70' (FIG. 10) extending between the ends 66 and 68. In the illustrated embodiment, the ends 66 and 68 are generally parallel and are vertically slanted relative to a longitudinal axis 65 of the tool body 64.

Preferably, and a shown in FIGS. 9 and 10, the sides 70, 70' of tool body 64 are gradually splayed outwardly relative to each other in the region of the opposed ends 66, 68. As such, the contact surface area of each striking face is advantageously increased by about 50% as compared to the general width or thickness of the tool 62. Moreover, this design inhibits splintering of the tool body 64 in response to repeated hammer blows being directed against the striking faces 66, 68 and, thus, enhancing the useful longevity of the tool 62.

The main body 64 of tool 62 also includes a top surface 72 and a bottom surface 74. As will be appreciated from an understanding of the present disclosure, the terms “top” and “bottom” are merely used as terms of convenience since the "top" and "bottom" surfaces of tool 62 pertain more to the particular orientation of the tool 62 during use.

Figure 11:
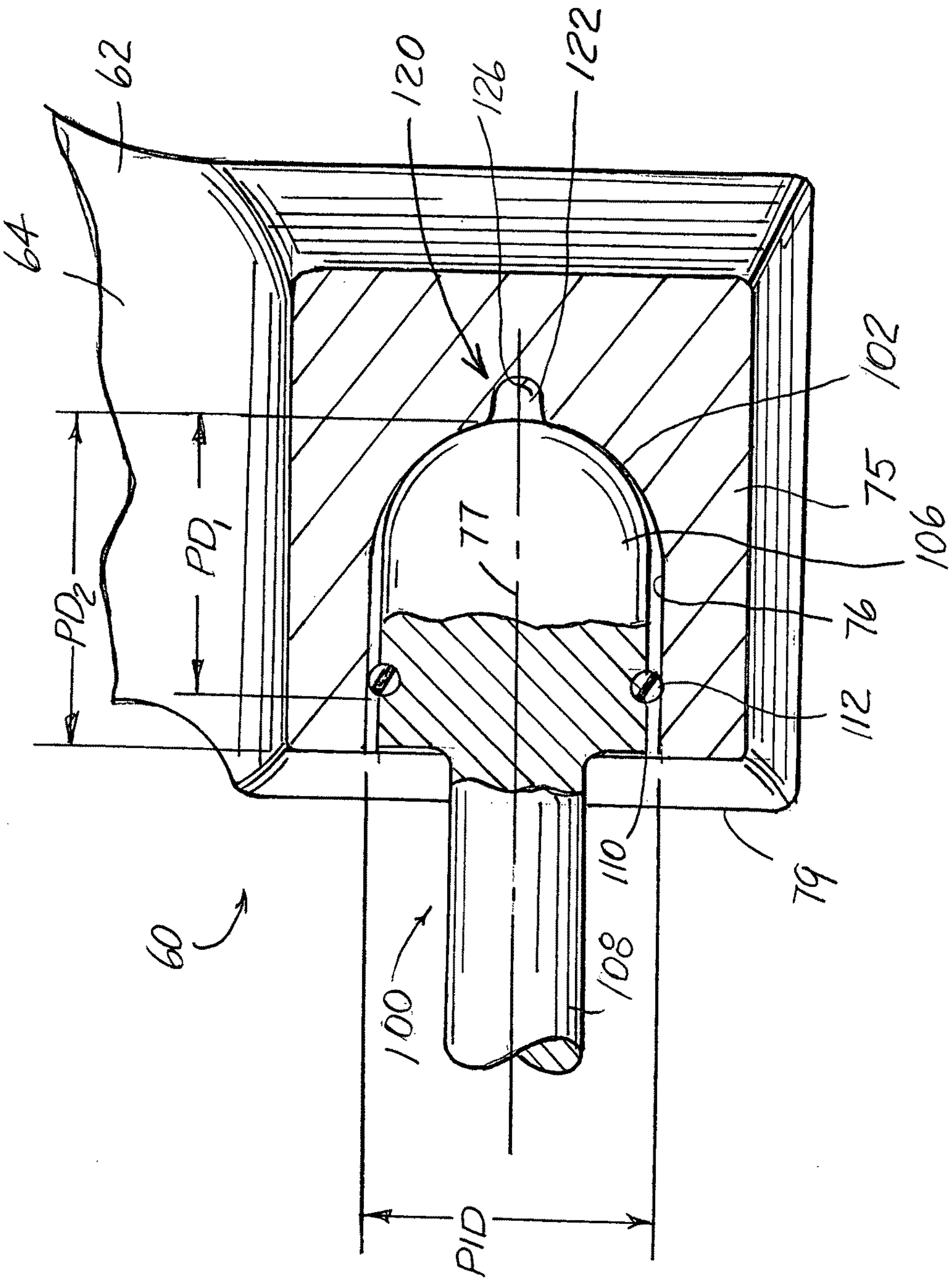
FIG. 11 is an enlarged partially sectioned view of a pin holder forming part of the tool shown in FIG. 8 and having an extractor pin releasably secured therein.

Tool 62 further includes a pin holder 75 secured to the tool body 64 preferably intermediate the ends 66 and 68. In the embodiment shown in FIGS. 9 and 10, the pin holder 75 extends laterally from one side 70, 70' of the main body 64 of the tool 62. As shown in FIG. 10, the pin holder 75 of tool 62 defines a blind recess 76 opening only at one end to the first end 66 of the tool body 64. As shown in FIG. 11, the recess 76 in the pin holder 75 has a longitudinal axis 77 and a predetermined inner diameter PID. Preferably, and as illustrated in FIG. 8, the axis 77 of recess 76 is vertically spaced from the bottom surface 74 of the tool body 64 by a predetermined distance PD generally equal to the distance between the top tooth surface 22 and axis 30 defined by the bores 29, 29' in the sides 27, 27' of the tooth 20 (FIG. 3). As such, and when the bottom surface 74 of the tool body 64 rests on the top tooth surface 22, the axis 77 of recess 76 generally aligns with the aligned bores 29, 29' in the sides 27, 27' of the tooth 20.

An outer surface 78 of the pin holder 75 preferably has a textured surface, i.e., knurling or the like, to enhance grasping of the tool 62. As shown in FIGS. 8 and 10, tool 62 furthermore preferably includes a vertical setting surface 79 forming a front face of the pin holder 75.

Returning to FIG. 8, and in a preferred form, tool 62 furthermore includes a plurality of pin retainer openings 80 arranged in side-by-side relation relative to each other. In the illustrated embodiment, the main body 64 of the tool 62 defines between three and six and preferably five openings 80. Each opening 80 has a profiled configuration preferably including a closed margin which is slightly smaller than a cross-sectional configuration of a "flex-pin" type retaining pin such that the tool body 64 is adapted to snugly accommodate and carry a plurality "flex-pin" retainers of the type described above. Each opening 80 defines an axis 82 (FIG. 10) extending generally normal to the length of the tool body 64.

Figure 8A:
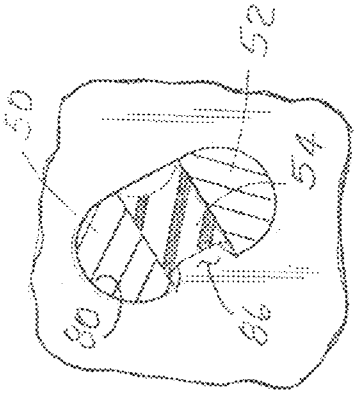
FIG. 8A is an enlarged view of that area encircled in phantom lines in FIG. 8.

As illustrated in FIG. 8A, a majority of the openings 80 in the tool 62 each include a projection 86 extending radially inward from the margin approximately midlength of the opening 80. After a "flex-pin" retainer is inserted into an opening 80, such projection 86 extends into a recess formed by the elastomer 54 between the pin halves 50, 52 whereby adding to the ability to releasably and snugly hold a "flex-pin" retainer in operable combination with the tool 62. When required, the "flex-pin" retainer is simply removed from any of the openings 80 in the tool 62 for insertion into operable combination with the tooth assembly 16.

In a preferred form shown in FIG. 8, the tool body 64 further includes indicia 84 extending thereacross for facilitating measuring the length of a particular retainer pin and/or other uses. In the exemplary embodiment, the indicia 84 is provided on both sides 70, 70' of the tool body 64 and extends generally parallel to the longitudinal axis 65 of the tool body 64. In a most preferred form, the indicia 84 is in the form of a measuring scale. Preferably, side 70 of the tool body 64 provides a measuring scale in inches. Preferably, side 70' of the tool body 64 provides a measuring scale in millimeters.

In the exemplary form shown in FIG. 8, and to remove a second type or "flex-pin" type retainer from the tooth assembly 16 whereby permitting replacement of a worn or broken tooth 20, the tool assembly 60 includes an extractor pin 90 which, in the illustrated embodiment is secured to the tool body 64. In the illustrated embodiment, extractor pin 90 includes a longitudinally elongated member 92 extending generally parallel to axis 65 of the tool body 64 and terminating in a free end 93. Notably, the cross-sectional configuration and size of free ended member 92 is less than the cross-section of either opening 29, 29' in the tooth 20 or the bore 19 defined by the adapter 18.

As shown in FIG. 8, the free ended member 92 of the extractor pin 90 is vertically spaced from the top or upper surface 72 of the tool body 64 for a major portion of its length. In this regard, and in a preferred form, the free length of the free ended member 92 comprising extractor pin 90 is about equal to the cumulative width of the adapter 18, in the region of the bore 19, plus the width of both sidewalls of the tooth 20 in the region of the openings 29, 29'.

As illustrated in FIG. 8, the free ended member 92 of extractor pin 90 defines a longitudinal centerline 94. Preferably, and as illustrated in FIG. 8, the longitudinal centerline 94 of the pin 90 is vertically spaced from the top surface 72 of the tool body 64 by a predetermined distance PD generally equal to the distance between the top tooth surface 22 and axis 30 defined by the bores 29, 29' in the sides 27, 27' of the tooth 20 (FIG. 3). As such, and when the top surface 72 of the tool body 64 rests on the top tooth surface 22, pin 90 generally aligns with the aligned bores 29, 29' in the sides 27, 27' of the tooth 20.

To further enhance the versatility of the tool assembly by permitting removal of the first type of retaining pin illustrated in FIGS. 3 and 4 and thereby allowing for replacement and/or repair of a digging tooth/wear part, the tool assembly 60 includes a second extractor pin 100 (FIG. 11). In the embodiment illustrated in FIG. 11, the extractor pin 100 is releasably secured to the main body 64 of tool 62 and, when positioned to forcibly remove the first type of retaining pin from a tooth assembly, pin 100 extends generally parallel to the axis 65 of tool 62 and generally parallel to the longitudinal axis 77 of the blind recess 76 defined by pin holder 75. When positioned to forcibly remove the first type of retaining pin from a tooth assembly, the axis of pin 100 is vertically spaced from the bottom tool surface 74 the predetermined distance PD which is generally equal to the distance between top surface 22 of tooth 20 and the axis 30 defined by the aligned bores 29, 29' in the tooth 20. As such, and when the bottom tool surface 74 rests on the top tooth surface 22, the free end of the extractor pin 100 generally aligns with the aligned bores 29, 29' in the sides 27, 27' of the tooth/wear part 20.

Figure 13:
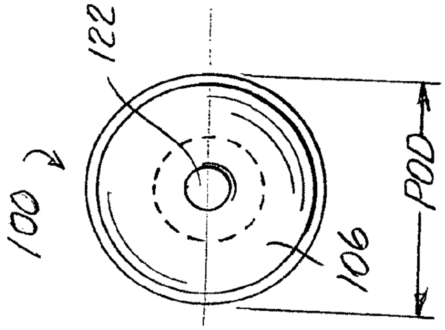
FIG. 13 is a right end view of the extractor pin shown in FIG. 12.
Figure 14:
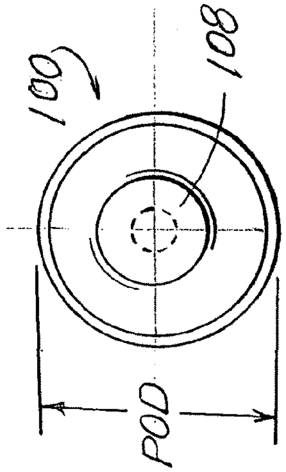
FIG. 14 is a left end view of the extractor pin shown in FIG. 12.

The extractor pin 100 of pin tool assembly 60 preferably has axially aligned first and second ends 102 and 104, respectively. In the embodiment shown in FIGS. 12, 13 and 14, the extractor pin 100 includes an enlarged head portion 106 toward end 102 and an axially elongated shank portion 108 extending from the head portion 106 and terminating in end 104 (FIG. 12). Preferably, and as shown in FIGS. 12 and 13, the elongated shank portion 108 of the extractor pin 100 has a generally cylindrical shape along its length and a diameter generally equal to the first type of retaining pin discussed above. Notably, the cross-sectional size of the shank portion 108 of pin 100 is smaller than the cross-sectional configuration of the extractor pin 90.

Returning to FIG. 11, cooperating instrumentalities 120 on the tool body 64 and the extractor pin 100 serve to releasably maintain and position the extractor pin 100 relative to the tool 62 when the pin tool assembly 60 is used to extract the first type of retaining pin from the tooth assembly 16 whereby permitting the tooth 20 to be replaced. Returning to FIG. 12, the head portion 106 of the extractor pin 100 has a predetermined outer diameter POD. Notably, and in the embodiment illustrated in FIG. 11, the predetermined inner diameter PID of the blind recess 76 in the pin holder 75 of tool 62 is slightly greater than the predetermined outer diameter POD of the head portion 106 of the pin extractor 100 (FIG. 12).

An elastomer is preferably used as part of the cooperating instrumentalities 120 to releasably maintain and position the extractor pin 100 relative to the tool 62. In the embodiment shown in FIG. 12, the head portion 106 of pin 100 has an annular groove or recess 110 disposed a first predetermined distance $PD_1$ from the end 102 of the pin 100. Notably, and as shown in FIG. 11, the longitudinal depth of the blind recess 76 defined by the pin holder 75 measures a second predetermined distance $PD_2$ between the closed and open ends of the recess 76. It is also important to note, in the preferred form shown in FIG. 11, the longitudinal or first predetermined distance $PD_1$ of the extractor pin head portion 106 is less than the second predetermined distance $PD_2$ or the longitudinal depth of the blind recess 76 defined by the pin holder 75.

In the embodiment shown in FIGS. 11 and 12, a compressible elastomeric ring 112 fits into and is maintained in the annular groove 110 defined by the extractor pin head portion 106. The elastomeric ring 112 has a predetermined outer diameter greater than the predetermined outer diameter POD of the head portion 106 of pin 100 and is generally equal to or slightly greater than the predetermined inner diameter PID of the blind recess 76 the pin holder 75 of tool 62. Suffice it to say, the cooperating instrumentalities 120 including the elastomeric ring 112 allow the pin extractor 100 to be snugly maintained within the blind recess 76 of the pin holder 75 of tool 62 while allowing for endwise removal of the pin extractor 100 therefrom.

The cooperating instrumentalities 120 further serve to facilitate proper orientation of the extractor pin 100 within the blind recess 76 defined by the pin holder 75. In the embodiment illustrated in FIGS. 11 and 12, the head portion 106 of the extractor pin 100 furthermore includes an axial and free ended projection or stabilizer 122 extending longitudinally away from the head portion 96 in an axial direction opposite from the shank portion 108. As shown in FIG. 11, and when the extractor pin 100 is fully inserted into the blind recess 76, the axial and free ended projection 122 projects into and is endwise accommodated within a socket or pilot hole 126 defined by the rearmost wall of the blind recess 76. When the axial and free ended projection 122 on the head portion 106 of the extractor pin 100 projects longitudinally into and is accommodated in the socket or pilot hole 126, pin 100 will be positioned and maintained in place on the tool assembly 60 to act to forcibly remove a first type of retainer pin from the digging tooth assembly 16.

Preferably, the tool 62 is configured such that the extractor pin 100 can be releasably carried by and operably associated with the tool 62 to significantly reduce the time and effort an operator is required to exert to extract a retainer pin from the digging tooth assembly 16. To advantageously affect these desired ends, and in the embodiment illustrated in FIG. 8, at least one of the openings 80 in the tool body 64 is preferably configured to enable the extractor pin 100 to be carried by and with the tool 62.

Figure 15:
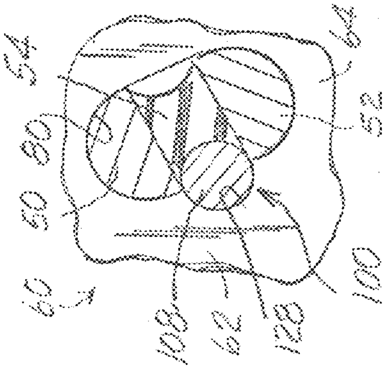
FIG. 15 is an enlarged view of that area encircled in dash lines in FIG. 8.

In the embodiment shown in FIG. 15, the marginal edge of at least one of the pin retainer openings 80 in the tool body 64 is preferably configured with a recess 128 proximately midlength between opposed ends of the respective recess 80. In one form, recess 128 has a convex profile. Suffice it to say, and after a “flex-pin” type retainer pin is inserted through the respective opening in the tool body 64 and into operable combination with the tool 62, the recess formed by the elastomer 54 between the pin halves 50, 52 of the “flex-pin” retainer combines with the recess 128 defined by the marginal edge of the opening 80 in the tool body 64 to define a void or space which is specifically sized to snugly accommodate the shank portion 98 of the extractor pin 90 therewithin. In combination with the elastomer on the “flex-pin” type retainer pin, the recess 128 provides a “slip resistant” cradle to better secure the extractor pin 100 to the tool body 62.

Besides use as an apparatus for removing a retaining pin of the type shown in FIGS. 3 and 4 from a digging tooth assembly, and to enhance the versatility thereof, the pin tool assembly 60 of the present disclosure can also be used to initially set a second type of retaining pin within the digging tooth assembly 16. Preferably, and since a plurality of the second type or“flex-pin” pin retainers are carried by the tool 62, the “flex-pin” retainers are readily available thus saving time and expense in securing a replacement tooth to an adapter.

Figure 16:
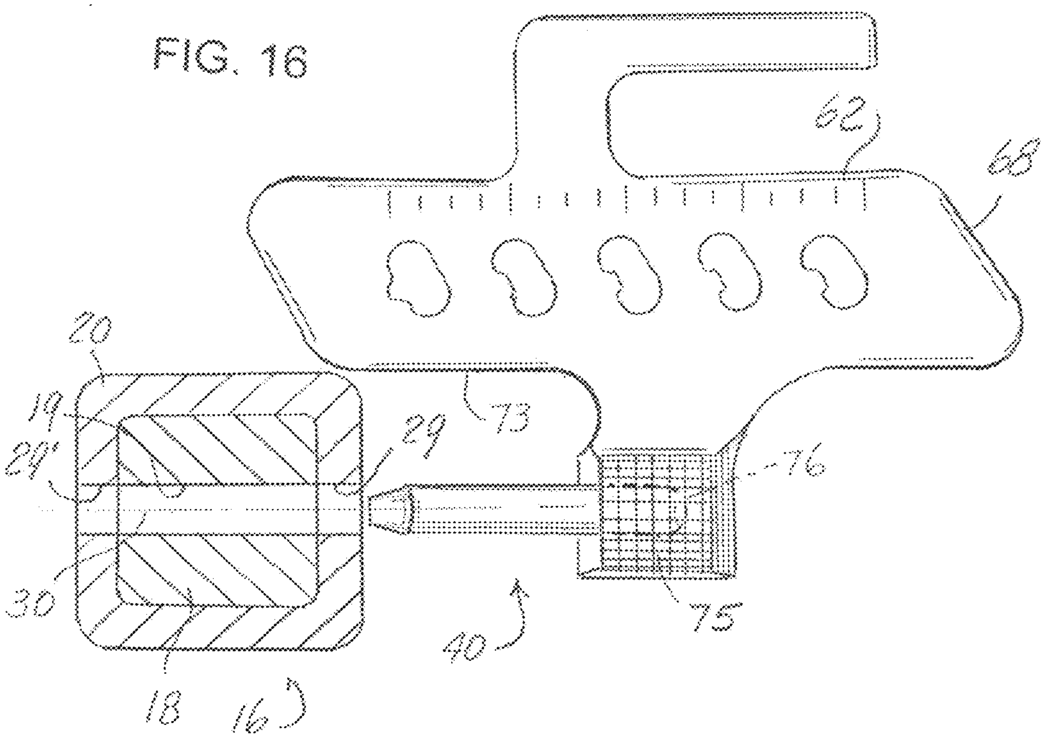
FIG. 16 is a elevational view of the tool assembly embodying principals of this invention disclosure being used to initially set a second type of retaining pin into operable combination with an adapter and tooth.

To still further enhance the versatility of the pin tool assembly 60, the predetermined inner diameter PID (FIG. 11) of the blind recess 76 in the tool 62 is sized and configured to hold and accommodate a tapered end of a “flex-pin” type or style retaining pin for initial setting within the tooth assembly 16 with the remainder of the “flex-pin” retainer pin extending in a cantilevered fashion from the pin holder 75 of the tool 62 (FIG. 16). and generally parallel to the axis 30 (FIGS. 3 and 16) defined by the aligned bores or pin receiving openings 29, 29' defined by the digging tooth 20. Notably, the predetermined inner diameter PID (FIG. 11) of the blind recess 76 in the tool 62 is preferably sized such that after the end of the “flex-pin” retainer is inserted into the blind opening or recess 76 in tool 62 that portion of the elastomer 54 of the “flex-pin” retainer extending into the pin holder 75 of tool 62 is squeezed or compressed by the pin holder 75 such that no additional or further support for the “flex-pin” retainer is required.

After inserting a tapered end of a second type or “flex-pin” retainer into the open end of the blind recess 76 of the pin holder, the opposite or free end of the “flex-pin” retainer is aligned with and initially disposed within either bore 29, 29' of the digging tooth 20. In this illustrated embodiment, and to facilitate alignment of the retaining pin with the openings 29, 29' in the digging tooth 20, the bottom surface 73 of the main body 64 of tool 62 rests against or is disposed upon the upper surface 22 of the digging tooth 20 into which the second type or “flex-pin” retainer is to be arranged in operable combination.

Thereafter, one or more hammer blows or strikes are directed against the second end 68 of the tool 62 until the free end of the “flex-pin” or second type of retainer is forcibly driven through the opening 29, 29' and into bore 19 in the adapter 18. The hammer blows preferably continue to be directed against the second end 68 of the tool 62 until the retaining pin is driven into the tooth assembly as far it can go while mounted in the pin holder 75 of tool 62. At that time, the tool 62 will be removed from the “flex-pin” retainer.

Figure 18:
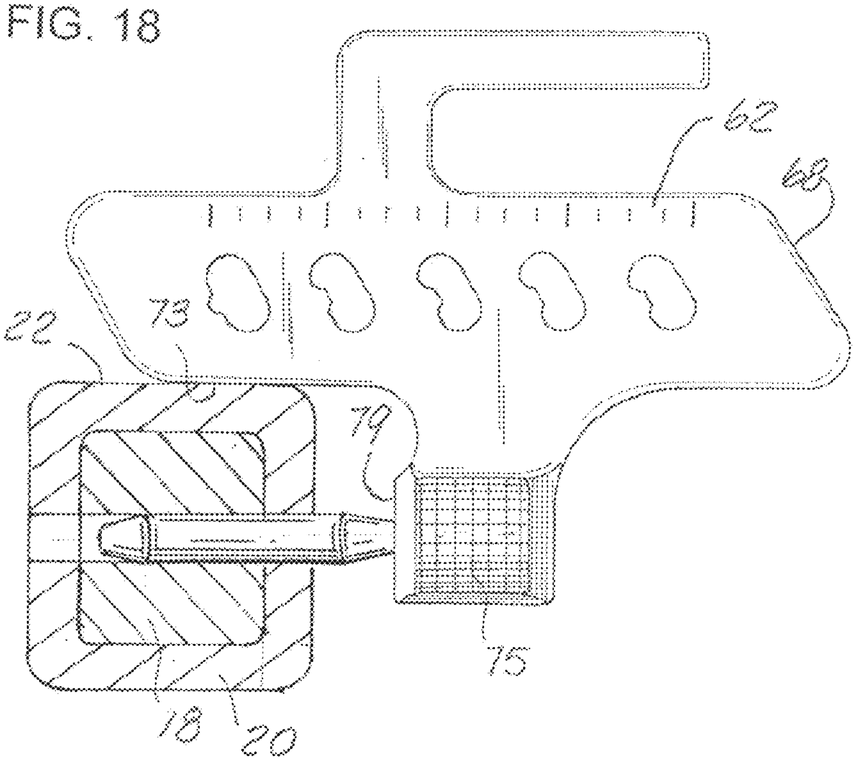
FIG. 18 is a similar to FIG. 17 showing the tool assembly being used to forcibly drive a second type of retaining pin into operable combination with an adapter and tooth.

Since the “flex-pin” retainer is not yet fully inserted into operable combination with the digging tooth assembly, and as shown in FIG. 18, the tool 62 is reorientated with the pin setting surface 79 of tool 62 being disposed against that end of the second type or “flex-pin” retainer extending from the side of the digging tooth. Although slightly reorientated, when the pin setting surface 79 of tool 62 is disposed against the “flex-pin” retaining pin, the bottom surface 73 of the tool 62 preferably rests against the upper surface 22 of the tooth 20. Striking blows are again directed against the second end 68 of tool 62 until the “flex-pin” retainer is fully inserted into the tooth 20 whereby operably coupling the adapter and tooth 20 in operable combination.

Figure 17:
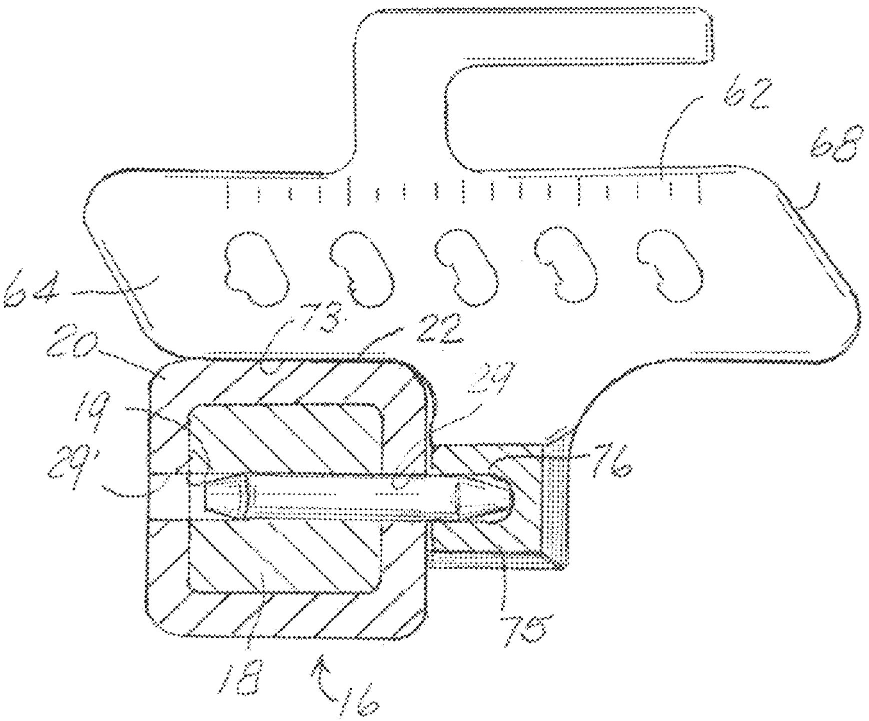
FIG. 17 is a view similar to FIG. 16 showing the tool assembly being used to forcibly drive a second type of retaining pin into operable combination with an adapter and tooth.
Figure 19:
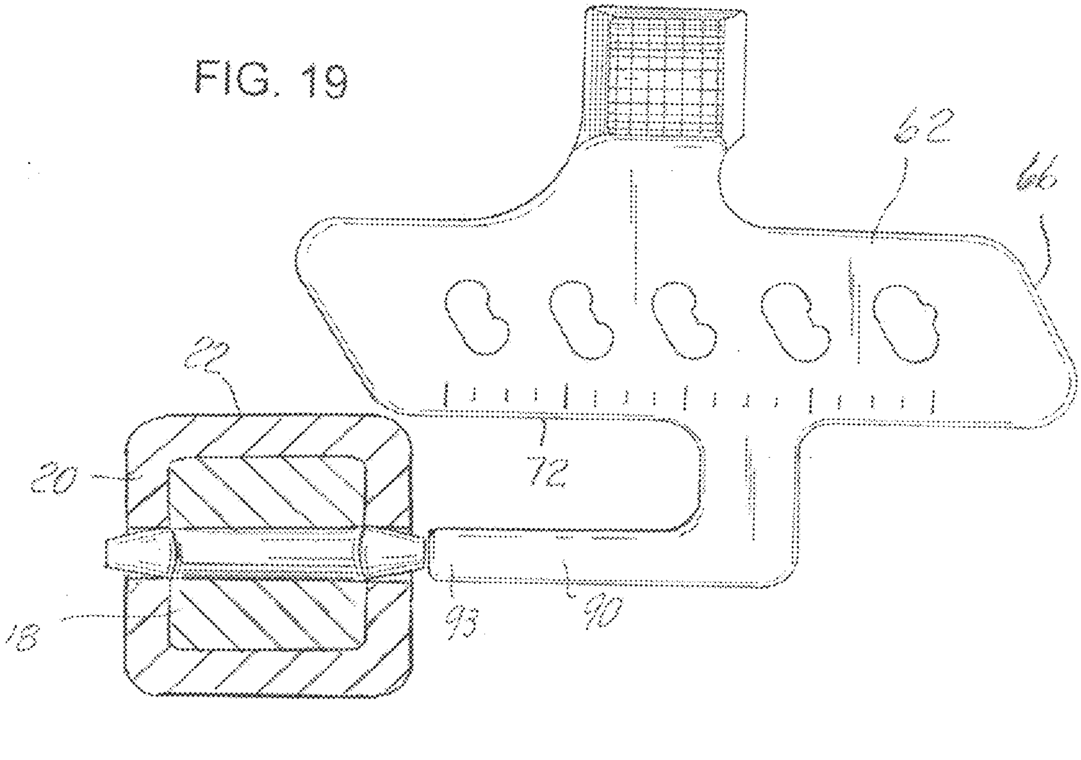
FIG. 19 is an elevational view of the tool assembly embodying principals of this invention disclosure being used to forcibly displace a second type of retaining pin from an adapter and tooth.

As will be appreciated from an understanding of the present invention disclosure, the preferred design of the present disclosure advantageously permits extraction of at least two different types of retaining pins from operable combination with the digging tooth assembly but with a single tool assembly thereby facilitating removal and replacement of a digging tooth. In one form, and so as to remove a second type or "flex-pin" retainer pin (FIGS. 6 and 7) from a worn or broken digging tooth, the tool 62 is inverted from the position shown in FIGS. 16, 17 and 18 to the position shown in FIG. 19 such that the extractor pin 90 of the tool 62 is aligned with the "flex-pin" retainer pin used to operably couple the adapter 18 and digging tooth 20 in operable combination. In a preferred form, and when the extractor pin 90 of tool 62 is aligned with the retainer pin, as shown in FIG. 19, surface 72 of the tool 62 preferably rests or is disposed against the upper surface 22 of the digging tooth 20.

After aligning the free end 93 of the extractor pin 90 relative to the first type of retainer pin, one or more hammer blows or strikes are directed against the end 66 of the tool 62. As such, the extractor pin 90 will forcibly and endwise displace the "flex-pin" retainer from the adapter 18 and tooth 20.

Alternatively, and to remove a first type of retainer pin (FIGS. 4 and 5) from a worn or broken digging tooth, the pin extractor 100 is arranged in operable combination with tool 62. That is, the head portion 106 of the pin extractor 100 is operably inserted into the blind socket or recess 76. Thereafter, the cooperating instrumentalities 120 on the tool 62 and pin 100 serve to position and maintain the pin extractor 100 relative to the tool 62. Thereafter, the free end of shank portion 108 of the pin extractor 100 is aligned with the retainer pin required to be removed so as to permit replacement of the digging tooth 20.

After aligning the free end of the pin extractor 100 relative to the retainer, one or more hammer blows or strikes are directed against the second end 68 of the tool 62. As such, the pin extractor 100 will cause the first type retaining pin to be forcibly removed from the adapter 18 and tooth 20 whereby permitting replacement of the digging tooth 20. Preferably, and when the free end of the pin extractor 100 is disposed against the retaining pin to be removed, the bottom surface 73 of the tool 62 preferably rests or is disposed against the upper tooth surface 22.

From the foregoing, it will be observed that numerous modifications and variations can be made and effected without departing or detracting from the true spirit and novel concept of this invention disclosure. Moreover, it will be appreciated, the present disclosure is intended to set forth an exemplification which is not intended to limit the disclosure to the specific embodiment illustrated. Rather, this disclosure is intended to cover by the appended claims all such modifications and variations as fall within the spirit and scope of the claims.

What is claimed is:

1. A pin tool assembly for forcibly removing a first type of retaining pin from a digging tooth arranged in side-by-side relation relative to other digging teeth across a forward edge of a digging implement, said pin tool assembly comprising:

a tool defining a blind recess disposed in laterally spaced relation relative to one side of said tool, with said blind recess opening to one end of said tool, and with said tool defining a predetermined diameter for said blind recess;

an elongated pin extractor having axially aligned first and second ends, said pin extractor including an enlarged head portion and a shank portion extending from said head portion; and instrumentalities including a stabilizer on at least one of the enlarged head portion of said elongated pin extractor and the blind recess in said tool for maintaining and positioning said extractor pin relative said tool such that, when a force is applied to a striking face of said tool, the shank portion of said elongated pin extractor engages with and forcibly extracts the retaining pin from said digging tooth.

2. The pin tool assembly according to claim 1 wherein said tool further defines a vertical surface disposed laterally adjacent to the recess defined by said tool.

3. The pin tool assembly according to claim 1 wherein said instrumentalities further include a compressible elastomer arranged around the enlarged head portion of said extractor pin for engagement with the predetermined diameter of said blind recess defined by said tool.

4. A pin tool assembly for forcibly removing a first type of retaining pin from a digging tooth arranged in side-by-side relation relative to other digging teeth across a forward edge of a digging implement, said pin tool assembly comprising:

a tool defining a blind recess disposed in laterally spaced relation relative to one side of said tool, with said blind recess opening to one end of said tool, and with said tool defining a predetermined diameter for said recess, and wherein said tool further defines a plurality of openings for snugly accommodating a plurality of a second type of retaining pin therein, with each opening having an axis extending generally normal to longitudinal axis of said tool;

an elongated pin extractor having axially aligned first and second ends, said pin extractor including an enlarged head portion and a shank portion extending from said head portion; and wherein instrumentalities on the enlarged head portion of said extractor pin and the blind recess in said tool maintain and position said extractor pin relative said tool such that, when a force is applied to a striking face of said tool, the shank portion of said elongated pin extractor engages with and forcibly extracts the retaining pin from said digging tooth.

5. The pin tool assembly according to claim 4 wherein the predetermined diameter of said blind recess is sized to releasably hold one of the second type of retaining pin at least partially therein for the initial setting of the second type of retaining pin in a bore of another digging tooth.

6. The pin tool assembly according to claim 4 wherein the tool further defines a generally vertical surface facing said one end of said tool in laterally adjacent relation relative to said blind recess and which is adapted to be set against one end of the second type of retaining pin after the second type of retaining pin has been initially set within the bore of said another digging tooth for completing setting of the second type of retaining pin.

7. The pin tool assembly according to claim 4 wherein a marginal edge of at least one of the plurality of openings defined by said tool is configured to accommodate and removably hold the shank portion of said elongated pin extractor between the second type of retaining pin and said tool.

8. A pin tool assembly for forcibly inserting and extracting a retaining pin from a digging tooth secured to an adapter on a digging implement, said pin tool assembly comprising:

an elongated pin extractor having axially aligned first and second ends, said pin extractor including an enlarged head portion and a shank portion extending from said head portion;

a tool having a main body with a first end, a striking face defining a second end of said tool, a bottom surface, and a pair of generally planar sides extending between said ends, with said tool further including a pin holder secured to said main body intermediate said ends and including a holder block disposed beneath said bottom surface and extending laterally from one side of said main body, with said holder block defining a blind recess opening to the first end of said main body, and with the blind recess in said holder block defining a predetermined diameter for said recess;

wherein instrumentalities including a stabilizer on at least one of the enlarged head portion of said extractor pin and the blind recess in said holder block maintain and position said pin extractor relative to the main body of said tool such that, when a force is applied to the striking face of said main body, the free end of the shank portion of said extractor pin engages with and forcibly extracts a first type of retaining pin from said digging tooth; and wherein the predetermined diameter of said blind recess is configured to hold a second type of retaining pin different from said first type of retaining pin for initial setting within a bore in the digging tooth.

9. The pin tool assembly according to claim 8 wherein the bottom surface of said tool is adapted to be disposed on the digging tooth while the second type of retaining pin is being set.

10. The pin tool assembly according to claim 8 wherein the bottom surface of said tool is adapted to be disposed on the digging tooth while the shank portion of said extractor pin engages with and forcibly extracts a first type of retaining pin from said digging tooth.

11. The pin tool assembly according to claim 8 wherein the main body of said tool further defines a vertical surface forming part of said pin holder.

12. The pin tool assembly according to claim 8 wherein an outer surface of the pin holder of said tool is provided with a textured surface configuration.

13. The pin tool assembly according to claim 8 wherein said instrumentalities further include a compressible elastomer arranged around the enlarged head portion of said extractor pin for engagement with the predetermined diameter of said blind recess in said pin holder.

14. A pin tool assembly for forcibly extracting a first type of retaining pin from a digging tooth secured to an adapter on a digging implement, said pin tool assembly comprising:

an elongated in extractor having axially aligned first and second ends, said pin extractor including an enlarged head portion and a shank portion extending from said head portion;

a tool having a main body with a first end, a striking face defining a second end of said tool, a bottom surface, and a pair of generally planar sides extending between said ends, with said tool further including a pin holder secured to said main body intermediate said ends and including a holder block disposed beneath said bottom surface and extending laterally from one side of said main body, with said holder block defining a blind recess opening to the first end of said main body, and with said holder block defining a predetermined diameter for said recess, and wherein the main body of said tool further defines a plurality of openings for snugly accommodating a plurality of a second type of retaining pin therein, with said second type of retaining pin being different from said first type, and with each opening defined by the main body of said tool having an axis extending generally normal to longitudinal axis of said main body;

wherein instrumentalities on the enlarged head portion of said extractor pin and the blind recess in said holder block maintain and position said pin extractor relative to the main body of said tool such that, when a force is applied to the striking face of said main body, the free end of the shank portion of said extractor pin engages with and forcibly extracts said first type of retaining pin from said digging tooth; and wherein the predetermined diameter of said blind recess is configured to hold said second type of retaining pin for initial setting within a bore defined by another digging tooth.

15. The pin tool assembly according to claim 14 wherein a marginal edge of at least one of the plurality of openings defined by said tool is configured to accommodate and removably hold the shank portion of said elongated pin extractor between the second type of retaining pin and said tool.

16. The pin tool assembly according to claim 14 wherein a marginal edge of at least one of the plurality of openings defined by said tool is configured to accommodate and removably hold the shank portion of said elongated pin extractor between the second type of retaining pin and said tool.

17. A pin tool assembly for forcibly extracting a retaining pin from a digging tooth secured to an adapter on a digging implement, said pin tool assembly comprising:

an elongated pin extractor having axially aligned first and second ends, said pin extractor including an enlarged head portion and a shank portion extending from said head portion;

a tool having a main body with a first end, a striking face defining a second end of said tool, a bottom surface, and a pair of generally planar sides extending between said ends, with said tool further including a pin holder secured to said main body intermediate said ends and including a holder block disposed beneath said bottom surface and extending laterally from one side of said main body, with said holder block defining a blind recess opening to the first end of said main body, and with said holder block defining a predetermined diameter for said recess;

wherein instrumentalities including a stabilizer on at least one of the enlarged head portion of said extractor pin and the blind recess in said holder block maintain and position said pin extractor relative to said main body of said tool such that, when a force is applied to the striking face of said main body, the free end of the shank portion of said pin engages with and forcibly extracts a first type of retaining pin from said digging tooth;

wherein the predetermined diameter of said blind recess is configured to hold a second type of retaining pin different from said first type of retaining pin for initial setting within a bore in the digging tooth; and a free-ended longitudinally elongated extractor pin secured to the main body in vertically spaced generally parallel relation relative to an upper surface of the main body.

18. The pin tool assembly according to claim 17 wherein the bottom surface of said tool is adapted to be disposed on the digging tooth while the second type of retaining pin is being set.

19. The pin tool assembly according to claim 17 wherein the upper surface of said tool is adapted to be disposed on the digging tooth while the free-ended longitudinally elongated extractor pin is used to extract a pin from the digging tooth.

20. The pin tool assembly according to claim 17 wherein the main body of said tool further defines a vertical surface forming part of said pin holder.

21. The pin tool assembly according to claim 17 wherein an outer surface of the pin holder of said tool is provided with a textured surface configuration.

22. The pin tool assembly according to claim 17 wherein said instrumentalities further include a compressible elastomer arranged around the enlarged head portion of said extractor pin for engagement with the predetermined diameter of said blind recess in said pin holder.

23. A pin tool assembly for forcibly extracting a first type of retaining pin from a digging tooth secured to an adapter on a digging implement, said pin tool assembly comprising:

an elongated pin extractor having axially aligned first and second ends, said pin extractor including an enlarged head portion and a shank portion extending from said head portion;

a tool having a main body with a first end, a striking face defining a second end of said tool, a bottom surface, and a pair of generally planar sides extending between said ends, with said tool further including a pin holder secured to said main body intermediate said ends and including a holder block disposed beneath said bottom surface and extending laterally from one side of said main body, with said holder block defining a blind recess opening to the first end of said main body, and with said holder block defining a predetermined diameter for said recess, and wherein the main body of said tool further defines a plurality of openings for snugly accommodating a plurality of a second type of retaining pin different from said first type of retaining pin therein, with each opening having an axis extending generally normal to a longitudinal axis of said main body;

wherein instrumentalities on the enlarged head portion of said extractor pin and the blind recess in said holder block maintain and position said pin extractor relative to said main body of said tool such that, when a force is applied to the striking face of said main body, the free end of the shank portion of said pin engages with and forcibly extracts the first type of retaining pin from said digging tooth;

wherein the predetermined diameter of said blind recess is configured to hold the second type of retaining pin for initial setting within a bore in the digging tooth; and a free-ended longitudinally elongated extractor pin secured to the main body in vertically spaced generally parallel relation relative to an upper surface of the main body.

* * * * *